US007647255B2

(12) United States Patent
Wang et al.

(10) Patent No.: US 7,647,255 B2
(45) Date of Patent: Jan. 12, 2010

(54) ROTABLE INVENTORY CALCULATION METHOD

(75) Inventors: Jihua Wang, Unionville, CT (US); Ravi Rajamani, West Hartford, CT (US); Robert Tomastik, Rocky Hill, CT (US); Thomas Gannon, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 1272 days.

(21) Appl. No.: 10/763,803

(22) Filed: Jan. 23, 2004

(65) Prior Publication Data

US 2005/0177467 A1    Aug. 11, 2005

(51) Int. Cl.
*G06Q 10/00* (2006.01)
(52) U.S. Cl. .............................. 705/28; 705/8
(58) Field of Classification Search ............. 705/28
See application file for complete search history.

(56) References Cited

U.S. PATENT DOCUMENTS

| | | | | |
|---|---|---|---|---|
| 5,608,621 A | * | 3/1997 | Caveney et al. | 705/10 |
| 5,946,662 A | * | 8/1999 | Ettl et al. | 705/8 |
| 5,953,707 A | * | 9/1999 | Huang et al. | 705/10 |
| 7,266,518 B2 | * | 9/2007 | Klim et al. | 705/28 |
| 7,370,001 B2 | * | 5/2008 | Harris | 705/10 |
| 2001/0034673 A1 | * | 10/2001 | Yang et al. | 705/28 |
| 2004/0024661 A1 | * | 2/2004 | Freel et al. | 705/28 |
| 2006/0047559 A1 | * | 3/2006 | Jacoby et al. | 705/10 |
| 2007/0016496 A1 | * | 1/2007 | Bar et al. | 705/28 |
| 2007/0156543 A1 | * | 7/2007 | Klim et al. | 705/28 |

OTHER PUBLICATIONS

Canada 3000 Enlists Rotable.com to Optimize Spare Parts Investment, Sep. 5, 2000, Business Wire, p. 883.*
Patricia Brown, Getting Inventories in Order, Apr. 2003, Overhaul & Maintenance, vol. IX, No. 3, p. 32.*

* cited by examiner

*Primary Examiner*—Matthew S. Gart
*Assistant Examiner*—Scott A Zare
(74) *Attorney, Agent, or Firm*—Carlson, Gaskey & Olds (57) ABSTRACT

A method for conducting a repairable inventory analysis calculates the minimum number of repairable parts to be held in inventory while still being able to satisfy the demand for spare parts even in view of uncertain repair lead times. The method uses a set of equations that relates a customer service level to arbitrary probability distribution functions of a repair lead-time and a part arrival process. The distributions are then searched to locate the optimal inventory level in the distribution.

16 Claims, 3 Drawing Sheets

ROTABLE INVENTORY CALCULATION METHOD

TECHNICAL FIELD

The present invention relates to a method for conducting repairable inventory analysis, and more particularly to a method for computing repairable inventory requirements under uncertainties.

BACKGROUND OF THE INVENTION

Many industries use repairable, or "rotable," inventories for economic reasons. Rotable parts are different from "expendable" parts, which are parts having a low enough value that the repair of such parts does not make economic sense. Rather, such expendible parts are merely discarded and replaced with new parts. Rotable parts, by contrast, tend to be more expensive, making their repair and reinstallation, rather than simple replacement with a new part, more economically justifiable.

Repairing a part or getting a new replacement can have uncertain lead times (i.e., the time interval between ordering a replacement and its delivery), and therefore rotable part inventories are used to bridge the gap between demand for the part and its supply as well as to maintain a selected high level of customer service. Due to the high cost of rotable parts, however, it is desirable to minimize the number of rotable parts held in inventory. But balancing minimal inventory with a desired customer service level (i.e., a measure of customer service defined as a ratio of parts delivered on time to the number of parts ordered) is difficult because the lead times for repairing parts and obtaining replacements are uncertain. Thus, there is a desire to calculate a minimum rotable inventory level that can satisfy a given customer service level.

Currently-known attempts to create models solving this problem have not provided satisfactory solutions because they use deterministic methods that assume parts arrive into a repair shop and are repaired according to standard time distributions. In actual practice, however, arrivals and repair time are much more uncertain. Thus, current models for optimizing rotable inventory do not generate satisfactory solutions because they fail to take these uncertainties into account. Further, assets may contain multiple types of rotable parts and the asset service level is determined by the service levels of individual part types. The interrelationships between those part types make it more difficult to determine optimal inventory levels for individual part types to achieve a desired assert service level. Deterministic methods are unable to consider the interrelationships between the parts.

There is a desire for a method that can calculate the optimum amount of rotable inventory needed to satisfy a given customer service level while taking these uncertainties into account.

SUMMARY OF THE INVENTION

The present invention is directed to a method for conducting a repairable inventory analysis that calculates the minimum number of repairable parts to be held in inventory while still being able to satisfy the demand for spare parts even in view of uncertain repair lead times. Given a service level, which is defined as a total number of on-time delivered parts delivered by the total number of requested parts, one embodiment of the method uses a set of equations that relates the optimal rotable inventory level to a customer service level, given arbitrary probability distributions of a repair lead-time and a part arrival process. A search procedure is used to find the optimal rotable inventory level.

In one embodiment, it is assumed that the number of parts requiring repair in a given time unit is constant and a part repair lead-time distribution is given. The mean and variance of the number of available parts at any time (or the amount of back orders, if the mean is negative) are computed. In this embodiment, this number is random and cab be proven to be normally distributed. A probability term that corresponds to a given probability level under a normal distribution is computed or looked up from a standard normal distribution table. The corresponding inventory level is computed from the probability term, the mean, and the variance. The number of on-time deliveries is then calculated based on its distribution, which is obtained by truncating the above-mentioned normal distribution with [0,A] and lumping the probability in each tail to the corresponding boundary. If the on-time delivery value is acceptably close to a desired on-time delivery value, the inventory level is deemed to be optimal and can meet desired customer service levels without having excessive, costly extra parts on hand. Otherwise, the probability level is updated following a search procedure, and the above calculation is repeated until the optimal inventory level is obtained.

In another embodiment, it is assumed that the number of arriving parts in a given time unit is random. The algorithm described in the previous embodiment still applies, except that the distribution of on-time delivery is more complicated and difficult to obtain in a closed form. Equations for computing the above distribution numerically, and for computing the mean and variance of the number of available parts at any time, are provided.

In another embodiment, an asset with multiple part types is analyzed. The asset service level is computed as the product of service levels of individual part types. With the above algorithm, inventory levels for individual part types can be obtained with given service levels, and the problem is formulated as finding the optimal service levels for individual part types. With known per-unit inventory costs, the optimization problem is formulated as minimizing total inventory cost, subject to the above service level relations, and the inventory-service level relationships for individual part types.

DETAILED DESCRIPTION OF THE EMBODIMENTS

The invention determines a minimum rotable inventory level that can still satisfy a given desired level of customer service by generating a set of equations that links customer service level to arbitrary probability distribution functions (including empirical distributions) reflecting repair lead-time and part arrival at a repair shop. The method represents a customer service level as a mean of the number of on-time delivered parts during a unit time interval divided by a mean number of arrivals per time unit to obtain a distribution of on-time delivered parts per time unit. A search procedure is used to locate the optimal inventory level using the distribution. Assets having multiple rotable part types can be analyzed using a constrained optimization method.

Figure 1:
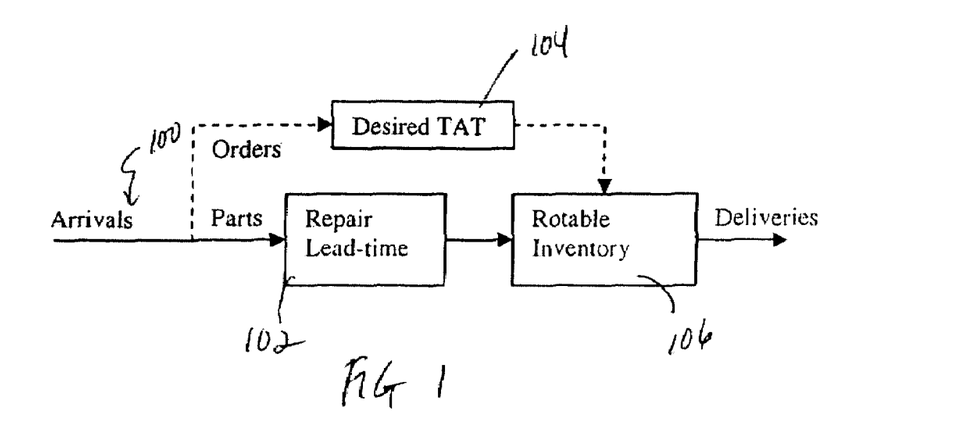
FIG. 1 is a block diagram illustrating a rotable inventory problem to be addressed by the invention.

FIG. 1 is a block diagram illustrating the rotable inventory problem to be addressed and optimized. As shown in the figure, rotable part arrivals 100 reach a repair shop according to an arrival probability distribution, which reflect the pattern in which parts arrive at a repair shop at a given time, and go through the repair process having a repair lead-time 102 with its own probability distribution. The arrival distribution and the repair lead-time distribution may be different from each other and, due to the nature of real world constraints, is uncertain.

The customer service level is determined based on a desired turn around time (TAT) 104. The customer service level is defined as the probability that a given part repair turnaround time is less than or equal to the customer's desired/contracted turnaround time 104. In FIG. 1, the path containing the desired turnaround time 104 corresponds to customer requests for obtaining repaired parts or replacements back. The desired turnaround time distribution 104 and the repair lead-time distribution 102 are then considered together to determine the optimum rotable inventory level 106 from which deliveries of repaired and replacement parts will be drawn.

The algorithms through which the optimal rotable inventory is calculated will now be described. For purposes of explanation in the equations below, I represents the rotable inventory level 106, W the desired turnaround time 104, and $\alpha$ represents a desired on-time delivery rate. The inventive method aims to find a minimum rotable inventory level I* at which the probability that customer turnaround time is less than or equal to the desired turnaround time value W is greater than or equal to the given desired probability level $\alpha$. In other words, the method aims to find a minimum rotable inventory level I* at which there is a high probability (as defined by $\alpha$) that the inventory level will be high enough to meet or exceed customer service expectations with respect to the turnaround time.

As noted above, the repair lead-time is uncertain, which therefore makes the customer's turnaround time uncertain as well. In other words, there is no way to predict how quickly a customer can get a repair done or a replacement part installed With the desired turnaround time 104, customer service level is defined as the probability that the customer turnaround time for getting a repair or replacement is less than or equal to the desired/contracted turnaround time 104, that is, the probability that a customer part demand is satisfied in a timely fashion. In the equation below, $w_{TAT}$ represents the random customer turnaround time (i.e., the time needed for a given part repair or replacement). Let $\alpha$ represent the desired service level. Then the customer service level requirement can be expressed by the following equation:

$$Pr(w_{TAT} \leq W) \geq \alpha \qquad (1)$$

According to the mathematical Law of Large Numbers, which is known in the art, the probability described in Equation 1 can be rewritten as:

$$Pr(w_{TAT} \leq W) = \lim_{k \to \infty} \left(\frac{m_k}{n_k}\right) \qquad (2)$$

where $m_k$ is the total number of on-time-delivered parts by time k (e.g., a day) and $n_k$ the total number of parts that need to be repaired (i.e., total repair demand) by time k. Equation 2 holds true because the ratio of on-time delivered parts to the total number of repaired parts will reflect the degree to which customer-requested turnaround times have been met.

If the number of parts arriving at the repair shop during a given time unit k is constant, the total number of parts that need to be repaired $n_k$ during the time unit can be expressed as:

$$n_k = A \cdot (k - W) \qquad (3)$$

where A is the number of parts that arrive by time k. As can be seen in Equation 3, the total repair demand $n_k$ therefore is the number of parts A that arrive by time k multiplied by a difference between the time k and the desired turnaround time W.

For the discussion below, assume that a random repair lead-time $\tau$ is within a minimum repair time r and a maximum repair time R (i.e., in the interval [r, R]). Based on this information, it is known with certainty that parts that are starting to be repaired at and before time (k–R) will be completed at time k, and parts starting after time (k–r) will still be in repair at time k. Parts having repair start times that start within time [k–R, k–r], however, may or may not be done by time k; in other words, there is a probability, rather than a certainty, that these parts will be done by time k. The total number of repaired parts that will be completely repaired by time k can therefore be expressed as:

$$R_k = A \cdot (k - R) + \sum_{i=k-R+1}^{k-r} \sum_{j=1}^{A} X_{ij}(k) \qquad (4)$$

where $X_{ij}(k)$ is a random binary variable equal to either 0 or 1. $X_{ij}(k)$ represents a repair status at time k for a given $j^{th}$ part that arrived at time i, where j=1, 2, . . . A; and i=k–R+1, k–R+2, . . . n–r. $X_{ij}(k)$ will equal 1 if the part is done being repaired at time k and will equal 0 otherwise.

Because A is a constant in this example, reflecting a constant number of part arrivals per time unit k, the number of on-time deliveries at a time k (i.e., $OT_k$) will fall in the interval [0, A].

$$\begin{aligned} OT_k &= \text{Min}(A, \text{Max}(0, I + R_k - n_{k-1})) \qquad (5) \\ &= \text{Min}\left(A, \text{Max}\left(0, I - A \cdot (R - W) + A + \sum_{i=k-R+1}^{k-r} \sum_{j=1}^{A} X_{ij}(k)\right)\right) \end{aligned}$$

In other words, the number of on-time deliveries will be the smaller of: (1) the total number of parts that have arrived A or (2) the larger of 0 and the difference between the total rotable inventory level and the number of parts whose repairs have been completed by time k.

The total number of on-time deliveries by time k can therefore be expressed as:

$$m_k = \sum_{i=1}^{k} OT_i \qquad (6)$$

By replacing $m_k$ and $n_k$ in Equation (2) with the expressions in Equations (3) and (6), the probability of on-time delivery of repaired parts can be expressed as:

$$\Pr(w_{TAT} \le W) = \lim_{k \to \infty}\left(\frac{m_k}{n_k}\right) = \frac{1}{A} \cdot \lim_{k \to \infty}\left(\frac{\sum_{i=1}^{k} OT_i}{k - W}\right) = \frac{\mu_{OT}}{A} \quad (7)$$

where $\mu_{OT}$ represents the mean on-time delivery of replacement/repaired parts. With the expression in Equation 7, it is now possible to find the minimum inventory level I* (which determines the mean on-time delivery $\mu_{OT}$) such that $$\frac{\mu_{OT}}{A} \ge \alpha$$

(i.e., the mean number of on-time delivered parts divided by the number of requested parts per time unit, which represents the actual delivery rate, is greater than or equal to the desired on-time delivery rate $\alpha$). Expressed another way, it is now possible to find the minimum inventory level I* such that $\mu_{OT} \ge \alpha \cdot A$.

For this calculation, assume that $X_{ij}(k)$ for all (i, j) are independent; that is, the repair of one part is not affected by the repair of another part. According to the Central Limit Theorem, which is known in the art, the term $$z_k = \sum_{i=k-R+1}^{k-r} \sum_{j=1}^{A} X_{ij}(k)$$

used in calculating the number of on-time deliveries at time k ($OT_k$) in Equation 5 above has a normal distribution with the following mean $\mu$ and variance $\sigma$.

$$\mu = \mu_k = \sum_{i=k-R+1}^{k-r} \sum_{j=1}^{A} E(X_{ij}(k)) = A \cdot \sum_{i=k-R+1}^{k-r} E(X_i(k)) = A \cdot \sum_{i=r}^{R-1} G_i \quad (8)$$

$$\sigma^2 = \sigma_k^2 = \sum_{i=k-R+1}^{k-r} \sum_{j=1}^{A} \mathrm{Var}(X_{ij}(k)) = A \cdot \sum_{i=r}^{R-1} G_i \cdot (1 - G_i) \quad (9)$$

where $G_i$ represents the repair lead-time distribution (i.e., the probability that repair lead-time will be less than or equal to time i).

Figure 2:
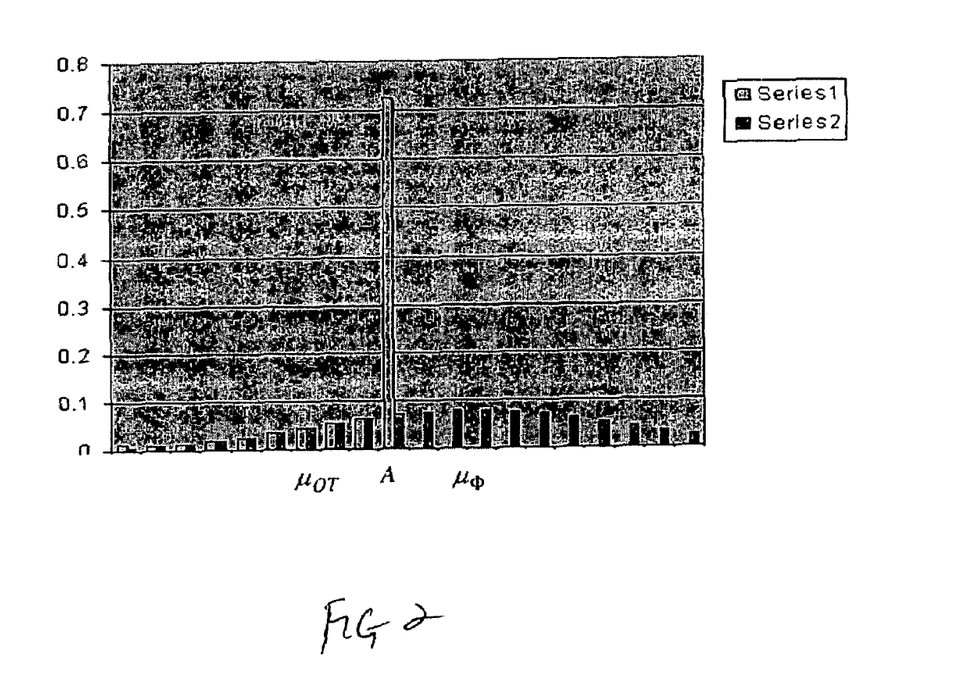
FIG. 2 is a graph depicting examples of on-time delivery distributions.

Referring to FIG. 2, it can be seen that the term ($I+R_k-n_{k-1}$), which reflects a given inventory level (I) plus the total number of parts repaired by time k (i.e., $R_k$) minus the total demand at time k−1 (i.e., $n_{k-1}$), has a normal distribution $\Phi$, as represented by Series 2 in FIG. 2, with a mean of $\mu_\Phi = I - A \cdot (R-W-I) + \mu$ and a variance $\sigma^2$. As also shown in FIG. 2, the on-time delivery $OT_k$ has a distribution $\Psi$, as represented by Series 1 in FIG. 2, that is truncated from the normal distribution $\Phi$ by removing the tails that lie beyond the area bounded by [0, A] and adding the mass probability in each tail to the mass probability at the corresponding boundary for each tail.

From this information, it is simple to compute the mean on-time delivery $\mu_{OT}$, and therefore the service level $\Pr(w_{TAT} \le W)$, that is possible for a given inventory level I. Given an inventory level I, the mean and variance of the normal distribution $\Phi$ can be computed using Equations (8) and (9). The probability mass distribution $\Psi$ of $OT_k$ can also be easily computed by adding the probability in the tail portion of its distribution to the probability at the boundary corresponding to the tail. With this distributions $\Psi$, the mean on-time delivery $\mu_{OT}$ can be computed.

Computing the required inventory I* from a specified probability for satisfying a part demand within a given turnaround time (i.e., $\Pr(w_{TAT} \le W)$), however, is less straightforward than computing the mean on-time delivery $\mu_{OT}$ because the non-linear minimum/maximum function used to define on-time delivery, as shown in Equation 5, has an irregular distribution. Because of this, a search procedure, such as the one shown in FIG. 3, may be used to determine a required minimum inventory level I* that can fulfill a given desired turnaround time with a selected probability.

Figure 3:
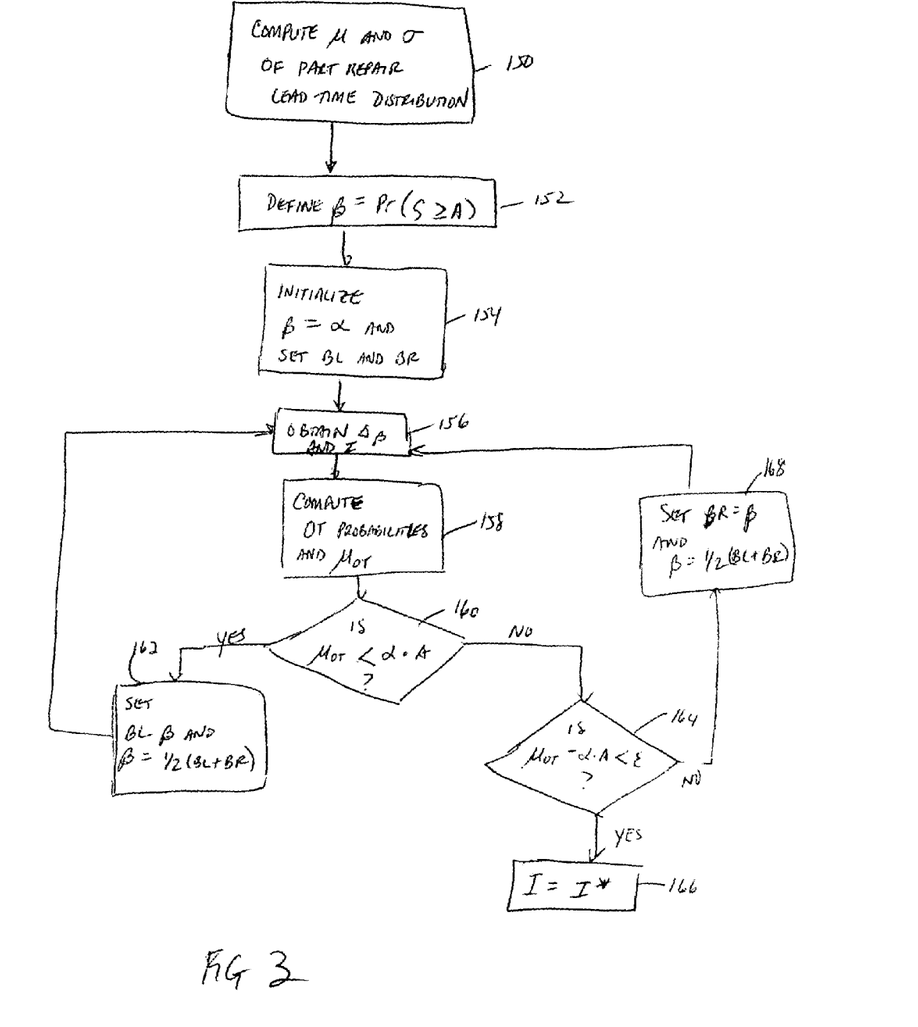
FIG. 3 is a flow diagram illustrating an example of a method used to find an optimal inventory level according to one embodiment of the invention.

The method shown in FIG. 3 assumes that the part repair lead-time distribution $G_i$ is given. From this information, the method first computes the mean $\mu$ and variance $\sigma$ of the part repair lead-time distribution using Equations (8) and (9) (block 150).

Next, the method defines a probability term $\beta = \Pr(\zeta \ge A)$ where $\zeta$ has a normal distribution $\Phi$ as represented in Series 2 in FIG. 2 (block 152). In other words, $\beta$ reflects the probability that $\zeta$ is greater than or equal to the number of parts arriving per unit time. Because $\beta$ is expressed as a probability, it is clear that $\beta \in (0, 1)$. Further, as reflected in the expression $\mu_\Phi = I - A \cdot (R-W-I) + \mu$ noted above, $\mu_\Phi$ is a function of the inventory level I. The method initializes $\beta$ as $\alpha$ (i.e., the desired on-time delivery rate) and sets its initial left and right bounds as BL and BR, respectively (block 154). The values for BL and BR can cover any desired range, and in one embodiment $\beta$ lies midway between BL and BR.

Next, a difference term $\Delta_\beta$ is searched or computed from a standard normal distribution table reflecting the distribution of $\beta$ via any known means (block 156); this difference term can be obtained by, for example, a standard normal distribution table. The inventory value I corresponding to the distribution of $\beta$ can be calculated from $I = A \cdot (R-W) - \mu + \Delta_\beta \cdot \sigma$, and this corresponding inventory value I is treated as a proposed inventory value for computing the on-time delivery probabilities that are eventually used to generate a mean on-time delivery value to be compared with the desired mean on-time delivery value.

From the known probability mass distribution $\Psi$ of $OT_k$ and the proposed inventory level I corresponding to $\beta$, the method computes on-time delivery probabilities for OT=0, 1, 2 . . . . A and determines the mean on-time delivery $\mu_{OT}$ based on the resulting on-time delivery probability distribution for each value of OT (block 158).

The mean on-time delivery value $\mu_{OT}$ is then compared with a desired mean on-time delivery value (i.e., the method checks if $\mu_{OT} \le \alpha \cdot A$) (block 160). If the mean on-time delivery value is less than the desired mean on-time delivery value, it indicates that the value selected for $\beta$ and its corresponding distribution are too far to the left on a distribution graph, causing the corresponding inventory level I to be too low with respect to the desired turnaround time (e.g., the proposed inventory level I is insufficient). In response, the left bound BL is set equal to the proposed value $\beta$ and $$\beta = \frac{1}{2} \cdot (BL + BB)$$

(block 162). In other words, β and BL are reset to cut the distance between the left and right bounds in half and move the position of β to a new location midway between the two bounds. The process then returns to block 156 to recompute the probability distribution of β with the new value for β as well as the new left and right bound values BL and BR.

If, however, the mean on-time delivery value is greater than or equal to the desired mean on-time delivery value, the difference between the mean on-time delivery value and the desired mean on-time delivery value is then compared with a selected convergence threshold $\epsilon$ (i.e., $\mu_{OT} - \alpha \cdot A < \epsilon$) (block 164). The value selected for e can be any desired small value reflecting convergence between the mean on-time delivery value and the desired mean on-time delivery value. If the difference between the mean and desired mean on-time delivery values is less than the convergence value, it indicates that the proposed inventory I calculated from the value for β and its corresponding value for $\Delta_\beta$ will result in a mean on-time delivery value that is nearly equal to the desired mean on-time delivery value within an acceptable degree. At this point, the calculated proposed inventory level reflects the minimum inventory level I* needed to fulfill the desired on-time delivery, and as noted above can be computed as $I = A \cdot (R-W) - \mu + \Delta_\beta \cdot \sigma$ (block 166).

If the difference between the mean and desired mean on-time delivery values is greater than the convergence value $\epsilon$, it indicates that the current value selected for β and its corresponding distribution are too far to the right on a distribution graph, causing the corresponding proposed inventory level I to be higher than needed to meet the desired turnaround time. In response, the method lets BR=β, $$\beta = \frac{1}{2} \cdot (BL + BB)$$

(block 168) before returning to block 156 to recompute the probability distribution of β with the new value for β as well as the new left and right bound values BL and BR. The process continues to iterate until the value for β results in an inventory level that causes the mean on-time delivery value to be close to the desired mean on-time delivery value within a desired convergence $\epsilon(\mu_{OT} - \alpha \cdot A < \epsilon)$.

As noted above, the process shown in FIG. 3 assumes that parts arrive at a repair shop in a constant manner, where the number of arrived parts A remains the same for each time unit (e.g., per day). The theory and calculations in a case assuming that part arrivals are random are somewhat different. Generally, the inventive process handles random part arrivals by finding a way to approximate the random arrivals with a constant arrival expression, thereby allowing the process shown in FIG. 3 to be carried out for random part arrivals.

More particularly, if it is assumed that the number of parts arriving at a repair shop at time k is random and represented by a random variable $A_k$, the total part demand by time k can be expressed as:

$$n_k = \sum_{t=0}^{k-W} A_t \tag{10}$$

The total number of repaired parts by time k, denoted as $R_k$, is also a random variable and includes repaired parts that are completed with certainty as well as parts that have a probability of being complete at time k. As explained above, given that R is a maximum repair lead-time and r is a minimum repair lead-time, it is known with certainty parts that arrive at and before time (k−R) are completed by time k, and parts starting after (k−r) are still in repair by time k. Parts that arrive within [k−R, k−r] may or may not be done by time k, causing them to be completed by time k with probability rather than with certainty. The total number of completed parts by time k can therefore be written as $$R_k = \sum_{t=0}^{k-R} A_t + \sum_{t=r}^{R-1} A_{k-t} G_t) \tag{11}$$

Similar to the example shown in Equation 5, the number of on-time deliveries at k can therefore be expressed as $$\begin{aligned} OT_k &= \text{Max}(0, \text{Min}(A_{k-W}, I + R_k - n_{k-1})) \\ &= \text{Max}\left(0, \text{Min}\left(A_{k-W}, I - \sum_{t=k-R+1}^{k-W-1} A_t + \sum_{t=r}^{R-1} A_{k-t} G_t\right)\right) \\ &= \text{Max}\left(0, \text{Min}\left(A_{k-W}, I + \sum_{t=k-R+1}^{k-W-1} A_t(G_{k-t} - 1) + \sum_{t=k-W}^{k-r} A_t G_{k-t}\right)\right) \end{aligned} \tag{12}$$

The problem is now to find the mean on-time delivery value $\mu_{OT}$ that will be greater than or equal to a desired mean on-time delivery value (i.e., $\mu_{OT} \geq \alpha \cdot A$), which will cause the inventory level calculated from the mean on-time delivery rate $\mu_{OT}$ to be the minimum inventory level I*.

Assuming that $A_k$ for all k are independent and with reference to the examples in Equations 8 and 9, the term $z_k$ used in calculating the number of on-time deliveries at time k can be expressed according to the Central Limit Theorem by $$z_k = \sum_{t=k-R+1}^{k-W-1} A_t(G(k-t) - 1) + \sum_{t=k-W}^{k-r} A_t G(k-t)$$

and will have a mean and variance of:

$$\begin{aligned} \mu &= \mu_k \\ &= \sum_{t=k-R+1}^{k-W-1} E(A_t)(G_{k-t} - 1) + \sum_{t=k-W}^{k-r} E(A_t) G_{k-t} \\ &= \bar{A}\left(\sum_{t=W+1}^{R-1} (G_t - 1) + \sum_{t=r}^{W} G_t\right) \end{aligned} \tag{13}$$

$$\begin{aligned} \sigma^2 &= \sigma_k^2 \\ &= \sum_{t=k-R+1}^{k-W-1} \text{Var}[A_t(G_{k-t} - 1)] + \sum_{t=k-W}^{k-r} \text{Var}[A_t G_{k-t}] \\ &= \sigma_A^2\left(\sum_{t=r}^{W} G_t^2 + \sum_{t=W+1}^{R-1} (G_t - 1)^2\right) \end{aligned} \tag{14}$$

As noted above with respect to the constant daily arrival example, $(I + R_k - n_{k-1})$ also has a normal distribution Φ (Series 2 in FIG. 2) with a mean of $I + \mu$ and a variance $\sigma^2$. Because $A_k$ is random in this example, the distribution of $OT_k$ is complicated. The distribution of $OT_k$ can be numerically calculated. The mean $\mu_{OT}$ can then be computed.

More particularly, assume that an arrival value $A_{k-W}$ and an inventory value $$I + \sum_{t=k-R+1}^{k-W-1} A_t(G_{k-t} - 1) + \sum_{t=k-W}^{k-r} A_t G_{k-t} \qquad (5)$$

are independent with their own respective distributions G and Φ, respectively. The distribution of the Max (·) term in $OT_k$ can then be numerically calculated as:).

$$F_{max}(w) = G(w) + \Phi(w) - G(w) \cdot \Phi(w) \qquad (15)$$

By forcing w>0 in the above distribution and adding the mass probability in the tail to the probability at 0, the distribution of OT is obtained in the same manner as in the constant arrival case.

If the variance in the random part arrivals $A_k$ is low, it is possible to approximate the random arrival with a constant daily arrival term $\overline{A}$. The algorithm for constant arrival can then be used even where the arrivals are actually random.

The examples above focus on optimizing inventory for a single part, but the inventive method can be applied for assets having multiple rotable parts without departing from the scope of the invention. Existing methods for constrained optimization problems can be applied to the inventive method to handle interrelations among rotable parts to find the optimal inventory for each part in the asset.

The algorithm described above can be extended to calculate optimal rotable inventory levels for individual parts in a single asset. Given an expected service level for an asset, the algorithm can determine optimal service levels and inventory levels for individual parts to fulfill the expected service level for the entire asset. In this example, it is assumed that an asset has a total of I rotable parts, indexed as i=1, 2, . . . I. The expected service level for the entire asset is p. With the service levels for individual parts denoted as $p_1, p_2, \ldots p_I$, the following condition needs to be satisfied to meet the expected service level for the entire asset:

$$\prod_{i=1}^{I} p_i \geq p. \qquad (16)$$

The left side of Equation 16 is the asset service level that is determined by the service levels of individual parts. As shown in previous examples, given a service level $p_i$ for a part i, the minimum rotable inventory can be computed for that part.

More particularly, let $x_i$ represent the computed inventory level, and let A represent the relationship defined by the algorithm illustrated in previous examples. The computed inventory level $x_i$ can be expressed as:

$$x_i = A(p_i) \qquad (17)$$

Let $c_i$ be the cost for having one unit of part i in inventory. Thus, the total rotable inventory cost can be written as:

$$J = \sum_{i=1}^{I} x_i \cdot c_i \qquad (18)$$

The rotable inventory levels for individual part types within the asset can therefore be obtained by solving the constrained optimization problem defined by Equations 16, 17 and 18. That is:

$$\min J \text{ with } J = \sum_{i=1}^{I} x_i \cdot c_i \qquad (19)$$

subject to $$\prod_{i=1}^{I} p_i \geq p$$

$$x_i = A(p_i), i = 1, 2, \ldots I.$$

$$p_i \in (0, 1], i = 1, 2, \ldots I.$$

With this constrained optimization problem defined, existing constrained optimization methods can be used to obtain the optimal rotable inventory levels for each part type in an asset to meet the customer service level for that asset.

The minimum inventory value I* therefore reflects the optimum rotable inventory level for a given service level, a given repair arrival, and repair time statistic data. By generating a service level and checking whether the average service level meets a desired service level, it is possible to calculate the minimum rotable inventory level that can satisfy the desired service level.

Figure 4:
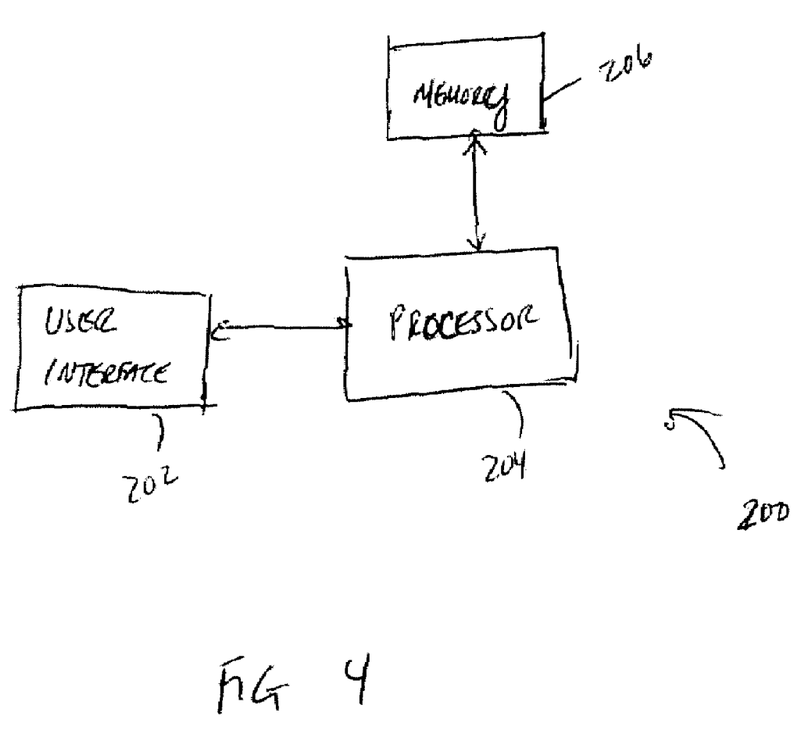
FIG. 4 is a block diagram illustrating one embodiment of a computer system that can implement the inventive method.

FIG. 4 is a block diagram of a computer system 200 that can be used to implement the method according to one embodiment of the invention. The system includes a user interface 202, a processor 204 that executes software that can carry out the inventive algorithm, and a memory 206 that stores data such as look-up tables, part type characteristic data, turn-around time information entered by the user, etc. The user interface 202 can be any system that allows a user to send data to and receive data from the processor 204, such as a keyboard/monitor combination, touch screen, graphical user interface, etc.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method of optimizing rotable inventory, comprising:
   interfacing a processor with a user interface, the user interface and the processor communicating with a computer having a computer readable storage medium including instructions for executing an algorithm to determine an optimized inventory level, the algorithm comprising the steps of:
   selecting a desired customer service level;
   obtaining at least one characteristic of a part repair lead-time distribution, wherein the at least one characteristic is a mean μ and a variance σ of the part repair lead-time distribution;
   computing on the computer a proposed inventory level based on said at least one characteristic, wherein computing a proposed inventory level includes recomputing a probability term β having a distribution reflected by a difference term $\Delta_\beta$ and calculating the proposed inventory level as I=A·(R−W)−μ+$\Delta_\beta$·σ, wherein I is the proposed inventory level, A is a part arrival value, R is a maximum repair time and W is a desired turnaround time window;

determining a calculated customer service level corresponding to the proposed inventory level;
comparing the calculated customer service level with the desired customer service level; and
selecting the proposed inventory level as the optimized inventory level when the calculated customer service level is within a selected convergence threshold with respect to the desired customer service level.

2. The method of claim 1, wherein the probability term $\beta$ is bound by a left bound value BL and a right bound value BR, and wherein the method further comprises:
shifting the probability term $\beta$ to the left bound value BL and defining a new probability term $\beta$ between the left bound value BL and the right bound value BR if the calculated customer service level is less than the desired customer service level; and
shifting the probability term $\beta$ to the right bound value BR and defining a new probability term $\beta$ between the left bound value BL and the right bound value BR if the calculated customer service level is greater than the desired customer service level and if the difference between the calculated customer service level and the desired customer service level is greater than the selected convergence threshold.

3. The method of claim 2, further comprising repeating the computing, determining, comparing and shifting steps until the selecting step is executed.

4. The method of claim 1, further comprising repeating the computing, determining, and comparing steps until the selecting step is executed.

5. The method of claim 1, wherein the desired customer service level is a desired on-time delivery, and the calculated customer service level is a mean on-time delivery, wherein the desired on-time delivery and the mean on-time delivery are represented by a mean of a number of on-time delivered parts per time unit divided by a mean of arrivals per time unit.

6. The method of claim 5, wherein a number of arrivals per time unit is a constant number, and wherein the mean of arrivals per time unit is set equal to the constant number.

7. The method of claim 1, wherein the part arrival value is randomly variable.

8. The method of claim 7, wherein the method further comprises:
obtaining an arrival value having a distribution G and an inventory value having a distribution $\Phi$;
obtaining a distribution of the calculated customer service level based from the distributions G and $\Phi$; and conducting the step of determining the calculated customer service level based on the distribution of the calculated customer service level.

9. The method of claim 7, wherein the method further comprises approximating the randomly variable number of arrivals per time unit with a constant number of arrivals per time unit.

10. The method of claim 1, wherein the method optimizes rotable inventory for an asset having a plurality of individual parts, wherein the step of selecting the desired customer service level comprises selecting the desired customer service level for the plurality of individual parts, and wherein the method further comprises:
conducting the obtaining, computing, determining, comparing, and selecting steps to obtain the optimized inventory level for each of said plurality of parts;
summing the optimized inventory level for each of the plurality of individual parts to obtain a total optimized inventory level;
calculating a total rotable inventory cost from the total optimized inventory level; and
minimizing the total rotable inventory cost.

11. The method of claim 10, wherein the minimizing step is conducted via a constrained optimization process.

12. A method of maintaining an optimized rotable inventory level, comprising:
determining an optimized inventory level, the determining step occurring on a computer having a computer readable storage medium storing instructions for:
selecting a desired customer service level;
obtaining at least one characteristic of a part repair lead-time distribution, wherein the at least one characteristic is a mean $\mu$ and a variance $\sigma$ of the part repair lead-time distribution;
computing on the computer a proposed inventory level based on said at least one characteristic, wherein computing a proposed inventory level includes recomputing a probability term $\beta$ having a distribution reflected by a difference term $\Delta_\beta$ and calculating the proposed inventory level as $I = A \cdot (R-W) - \mu + \Delta_\beta \cdot \sigma$, wherein I is the proposed inventory level, A is a part arrival value, R is a maximum repair time and W is a desired turnaround time window;
determining a calculated customer service level corresponding to the proposed inventory level;
comparing the calculated customer service level with the desired customer service level; and
selecting the proposed inventory level as the optimized inventory level when the calculated customer service level is within a selected convergence threshold with respect to the desired customer service level; and
maintaining an inventory level responsive to said optimized inventory level.

13. The method of claim 12, further comprising interfacing with a user interface.

14. The method of claim 13, further comprising interfacing a processor with the user interface to determine the optimized inventory level.

15. The method of claim 14, further comprising storing data in a memory to be used by the processor to determine the optimized inventory level.

16. A computer readable storage medium including a set of instructions that causes a computer to perform the following steps:
interfacing a user interface with a processor
storing data on a memory to be used by the processor to execute an algorithm;
executing the algorithm on the processor to determine an optimized inventory level, the algorithm comprising the steps of:
selecting a desired customer service level;
obtaining at least one characteristic of a part repair lead-time distribution, wherein the at least one characteristic is a mean $\mu$ and a variance $\sigma$ of the part repair lead-time distribution;
using the computer readable storage medium on a computer to compute a proposed inventory level based on said at least one characteristic, wherein computing a proposed inventory level includes recomputing a probability term $\beta$ having a distribution reflected by a difference term $\Delta_\beta$ and calculating the proposed inventory level as $I = A \cdot (R-W) - \mu + \Delta_\beta \cdot \sigma$, wherein I is the proposed inventory level, A is a part arrival value, R is a maximum repair time and W is a desired turnaround time window;
determining a calculated customer service level corresponding to the proposed inventory level;

comparing the calculated customer service level with the desired customer service level; and selecting the proposed inventory level as the optimized inventory level when the calculated customer service level is within a selected convergence threshold with respect to the desired customer service level.

* * * * *

UNITED STATES PATENT AND TRADEMARK OFFICE
CERTIFICATE OF CORRECTION

PATENT NO. : 7,647,255 B2  
APPLICATION NO. : 10/763803  
DATED : January 12, 2010  
INVENTOR(S) : Jihua Wang It is certified that error appears in the above-identified patent and that said Letters Patent is hereby corrected as shown below:

The Title Page, showing an illustrative Figure, should be deleted and substitute therefor the attached title page.

IN THE DRAWINGS:

Please replace the informal drawings with the attached formal drawings.

Signed and Sealed this

Eighth Day of June, 2010

David J. Kappos  
*Director of the United States Patent and Trademark Office*

CERTIFICATE OF CORRECTION (continued)

(12) United States Patent
Wang et al.

(10) Patent No.: US 7,647,255 B2
(45) Date of Patent: Jan. 12, 2010

(54) ROTABLE INVENTORY CALCULATION METHOD

(75) Inventors: Jihua Wang, Unionville, CT (US); Ravi Rajamani, West Hartford, CT (US); Robert Tomastik, Rocky Hill, CT (US); Thomas Gannon, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 1272 days.

(21) Appl. No.: 10/763,803

(22) Filed: Jan. 23, 2004

(65) Prior Publication Data

US 2005/0177467 A1 Aug. 11, 2005

(51) Int. Cl.
*G06Q 10/00* (2006.01)
(52) U.S. Cl. .................................. 705/28; 705/8
(58) Field of Classification Search ............. 705/28
See application file for complete search history.

(56) References Cited

U.S. PATENT DOCUMENTS

| | | | | |
|---|---|---|---|---|
| 5,608,621 A * | 3/1997 | Caveney et al. | | 705/10 |
| 5,946,662 A * | 8/1999 | Ettl et al. | | 705/8 |
| 5,953,707 A * | 9/1999 | Huang et al. | | 705/10 |
| 7,266,518 B2 * | 9/2007 | Klim et al. | | 705/28 |
| 7,370,001 B2 * | 5/2008 | Harris | | 705/10 |
| 2001/0034673 A1 * | 10/2001 | Yang et al. | | 705/28 |
| 2004/0024661 A1 * | 2/2004 | Freel et al. | | 705/28 |
| 2006/0047559 A1 * | 3/2006 | Jacoby et al. | | 705/10 |
| 2007/0016496 A1 * | 1/2007 | Bar et al. | | 705/28 |
| 2007/0156543 A1 * | 7/2007 | Klim et al. | | 705/28 |

OTHER PUBLICATIONS

Canada 3000 Enlists Rotable.com to Optimize Spare Parts Investment, Sep. 5, 2000, Business Wire, p. 883.*
Patricia Brown, Getting Inventories in Order, Apr. 2003, Overhaul & Maintenance, vol. IX, No. 3, p. 32.*

* cited by examiner

*Primary Examiner*—Matthew S. Gart
*Assistant Examiner*—Scott A Zare
(74) *Attorney, Agent, or Firm*—Carlson, Gaskey & Olds (57) ABSTRACT

A method for conducting a repairable inventory analysis calculates the minimum number of repairable parts to be held in inventory while still being able to satisfy the demand for spare parts even in view of uncertain repair lead times. The method uses a set of equations that relates a customer service level to arbitrary probability distribution functions of a repair lead-time and a part arrival process. The distributions are then searched to locate the optimal inventory level in the distribution.

16 Claims, 3 Drawing Sheets

UNITED STATES PATENT AND TRADEMARK OFFICE
CERTIFICATE OF CORRECTION

PATENT NO.      : 7,647,255 B2                                                          Page 1 of 1
APPLICATION NO. : 10/763803
DATED           : January 12, 2010
INVENTOR(S)     : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1756 days.

Signed and Sealed this

Twenty-eighth Day of December, 2010

David J. Kappos
*Director of the United States Patent and Trademark Office*